United States Patent
Liu et al.

(10) Patent No.: US 11,298,797 B2
(45) Date of Patent: Apr. 12, 2022

(54) WHEEL FIXTURE

(71) Applicant: CITIC Dicastal CO., LTD., Hebei (CN)

(72) Inventors: Xiao Liu, Qinhuangdao (CN); Zuo Xu, Qinhuangdao (CN); Jiandong Guo, Qinhuangdao (CN); Xiaopeng Chen, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 643 days.

(21) Appl. No.: 16/223,361

(22) Filed: Dec. 18, 2018

(65) Prior Publication Data

US 2019/0321939 A1 Oct. 24, 2019

(30) Foreign Application Priority Data

Apr. 19, 2018 (CN) .......................... 201810351792.5

(51) Int. Cl.
*B24B 41/06* (2012.01)
*B23Q 3/06* (2006.01)

(52) U.S. Cl.
CPC .............. *B24B 41/061* (2013.01); *B23Q 3/06* (2013.01); *B24B 41/065* (2013.01); *B24B 41/066* (2013.01); *B24B 41/067* (2013.01)

(58) Field of Classification Search
CPC ..... B23B 31/14; B23B 31/141; B23B 31/142; B23B 31/16229; B23B 31/30; B23B 31/185; B23B 31/18; B23B 31/177; B23B 31/16287; B23B 31/16295; B23B 2231/26; B23B 2215/08; B23Q 11/00; B23Q 17/003; B23Q 17/005; B23Q 3/062; B23Q 3/06; B24B 41/061; B24B 41/065; B24B 41/066; B24B 41/067
See application file for complete search history.

(56) References Cited

U.S. PATENT DOCUMENTS

| | | | | |
|---|---|---|---|---|
| 3,076,662 A | * | 2/1963 | Kostyrka | B23B 31/16291 279/4.11 |
| 4,270,763 A | * | 6/1981 | Rohm | B23B 31/16245 279/110 |
| 4,437,675 A | * | 3/1984 | Koenig, III | B23B 31/14 279/119 |
| 4,838,561 A | * | 6/1989 | Baranzelli | B23B 31/16241 279/127 |
| 5,820,137 A | * | 10/1998 | Patterson | B23B 31/185 279/141 |
| 2017/0312834 A1 | * | 11/2017 | Guo | B23B 31/30 |

* cited by examiner

*Primary Examiner* — Tyrone V Hall, Jr.
*Assistant Examiner* — Makena S Markman
(74) *Attorney, Agent, or Firm* — IPro, PLLC

(57) ABSTRACT

A wheel fixture is disclosed. A main shaft drives a first positioning pull rod on a chuck body to extend and contract in the radial direction via a tightening screw, a clamping jaw is at a position within the travel range of extension and contraction, a wheel is positioned and clamped by the fixture, airtight support blocks are pressed down by the wheel and flush with the support plane of the clamping jaw, at this time, airtight ejector rods press second O rings to prevent air from flowing out of the airtight detection position, a detection system of a machine tool detects a preset air pressure value which indicate that the wheel has been placed correctly, and if the wheel is not placed correctly on the fixture, the machine tool will alarm through the detected pressure feedback.

4 Claims, 3 Drawing Sheets

WHEEL FIXTURE

CROSS-REFERENCE TO RELATED APPLICATIONS

The present application claims benefit of Chinese Patent Application No. 201810351792.5, filed on Apr. 19, 2018, the contents of which are hereby incorporated by reference in its entirety.

BACKGROUND

The machining process for a wheel usually requires three-procedure machining. The front, the rim, the center hole and other parts of the wheel are usually machined in the second procedure. However, due to the difference in outer diameter parameters of wheels of different sizes, it is difficult to machine hubs of different sizes with a set of fixture within the limited travel of a chuck. In the actual machining process, whenever wheels of different sizes need to be replaced, a set of parts or even a complete set of fixture needs to be replaced, which increases the production assistance time of the workshop, reduces the production efficiency and increases the labor intensity of workers. If an automatic fixture adapting to multiple different sizes of wheels can be researched and developed, the production efficiency will be greatly improved.

In addition, the maximum clamping force that the fixture can provide will be partially lost with the gradual increase of the rotational speed. The design of a suitable centrifugal force compensation mechanism can ensure the safety and reliability of the machining.

SUMMARY

The present disclosure relates to the field of automobile engineering, specifically to a wheel fixture.

The objective of the present disclosure is to provide a wheel fixture.

A wheel clamp includes a clamping jaw, a first positioning pull rod, a balance block housing, a first guide shaft, a deflection block, a balance block 6, a base, pins, second positioning pull rods, a protection ring, airtight bases, airtight ejector rods, airtight support blocks, second guide shafts, airtight covers, pressure plates, first pins, first screws, second screws, a chuck body, a tightening screw, a third screw, a first O ring, fourth screws, slotted pan head set screws, second O rings, third O rings, a fifth screw, a main shaft, a sixth screw, a spring, first hexagon head hole screws, a second hexagon head hole screw, seventh screws, eighth screws, and ninth screws.

The base is connected to the main shaft by the fifth screw, the chuck body is fixed to the base by the third screw, the tightening screw connects the chuck body with the main shaft, and the protection ring presses the first O ring to the gap between the chuck body and the base, plays a sealing role and is tightened with the sixth screw. The lower surfaces of the six groups of second positioning pull rods are engaged with the toothed surface of the chuck body and tightened with two second screws respectively, the first positioning pull rod is connected and fixed to the second positioning pull rods by the two pins, the clamping jaw is connected and fixed to the first positioning pull rod by the two first screws and the two first pins, the balance block housing is connected and fixed to the base by the seventh screws, the first guide shaft passes through a through hole of the balance block housing and passes through the deflection block, two ends of the balance block housing restrict the axial movement of the first guide shaft via screws, the balance block is mounted in an inner groove of the balance block housing, the two second guide shafts pass through the through holes of the balance block and enter a bottom hole of the balance block housing, the second guide shafts are tightened on corresponding threaded holes of the balance block housing via the two first hexagon head hole screws, and the axial movement of the two second guide shafts is restricted. The spring is arranged in a bottom hole of the balance block, the second hexagon head hole screw is tightened on a corresponding threaded hole of the balance block housing to restrict the axial movement of the spring, the two pressure plates are mounted at the two ends of the first positioning pull rod, and the pressure plates are connected and fixed to the balance block housing by a group of eighth screws to restrict the movement of the first positioning pull rod in the axial direction of the main shaft. Three groups of airtight mechanisms are uniformly distributed in the circumferential direction of the upper surface of the base, in which the airtight base is connected and fixed to the base by a group of ninth screws, the third O ring is mounted in a lower groove of the airtight base, the airtight ejector rod is mounted in a circular hole of the airtight base, two slotted pan head set screws are used to restrict the rotation of the airtight ejector rod, the second O ring is mounted between the airtight base and the airtight ejector rod, the airtight support block is connected and fixed to the upper surface of the airtight ejector rod by a fourth screw, and the airtight cover seals the air passage inside the base through a group of ninth screws and a third O ring.

The clamping jaw is made of high-strength aluminum alloy.

The balance block housing, the first guide shaft and the deflection block are made of CrMo material for resisting high centrifugal force.

The fixture can adapt to multiple sizes of wheels by adjusting the position of the stepped clamping jaw on the first positioning pull rod, each position can adapt to two sizes, and the fixture finally can adapt to multiple sizes of wheels by moving four positions.

The two slotted pan head set screws are kept horizontal in the slotted direction during use, pressed into slots by a flexible wire and tightened to relax.

The two first hexagon head hole screws and the second hexagon head hole screw are kept identical in hole directions during use, and the flexible wire is passed through the hexagon head hole screws and tightened for relaxing.

The outer surface of the deflection block is machined by low-speed wire cutting to ensure the surface roughness.

A plurality of weight reduction pits is disposed in the lower surface of the base.

The positioning pull rods have height difference due to wear after long-term use, so the positioning pull rods are designed in two parts in the present disclosure: a first positioning pull rod and second positioning pull rods, which facilitates the adjustment of the height clearance of the fixture.

The balance block housing is connected with the base by grooves and pins besides screws to ensure accurate positioning.

The balance block is restricted by the second guide shafts to a fixed height such that sufficient clearances are reserved between the upper and lower surfaces of the balance block and the balance block housing and the base to prevent interference and affect the smooth operation of the fixture.

Compared with the existing commercial wheel fixtures, the fixture of the present disclosure has the advantages of simple structure, reliable performance and greatly reduced weight, can adapt to multiple sizes of wheels, and has larger machining flexibility.

Figure 1:
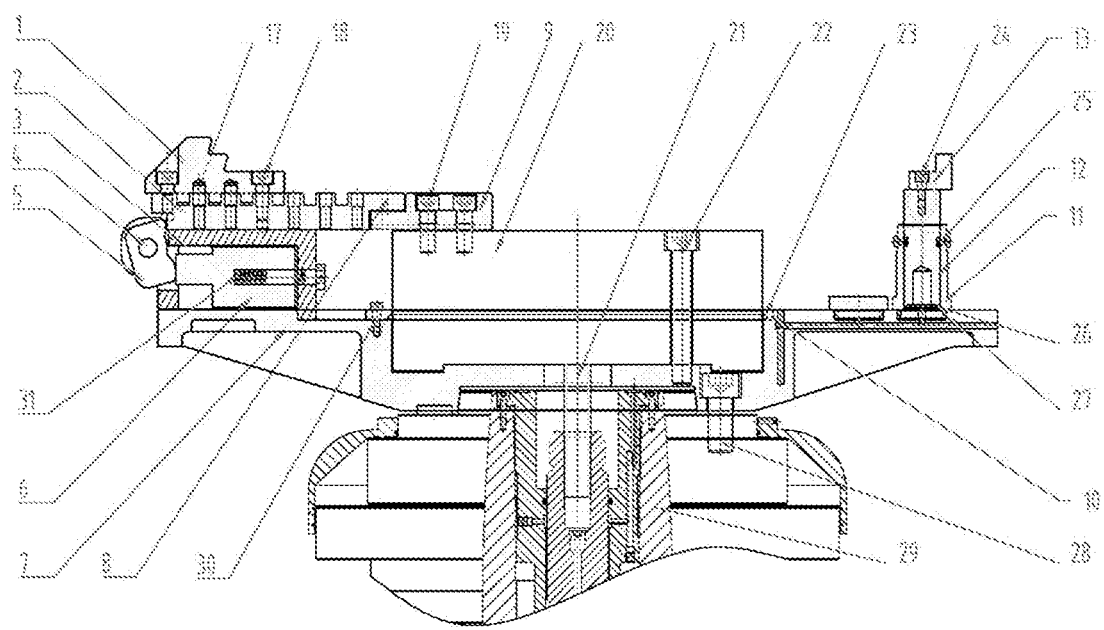
FIG. 1 is a front view of a wheel fixture according to the present disclosure.
Figure 2:
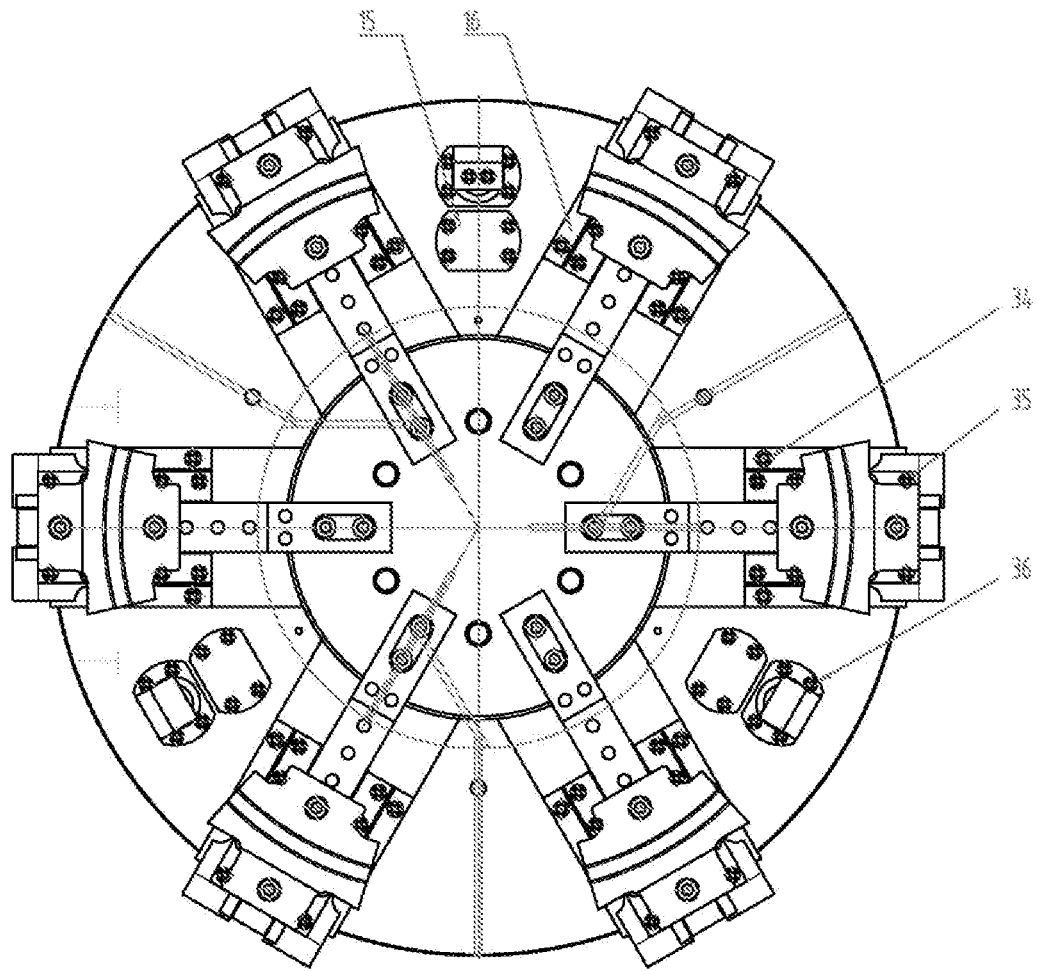
FIG. 2 is a top view of the wheel fixture according to the present disclosure.
Figure 3:
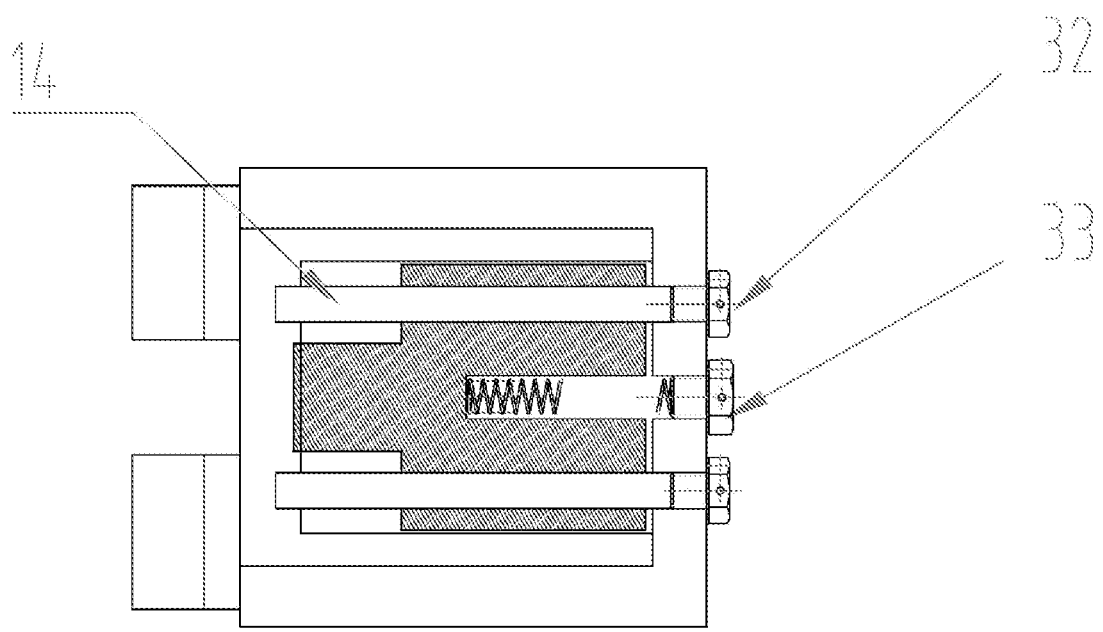
FIG. 3 is a sketch of a centrifugal force compensation mechanism of the wheel fixture according to the present disclosure.

LIST OF REFERENCE SYMBOLS 1-clamping jaw, 2-first positioning pull rod, 3-balance block housing, 4-first guide shaft, 5-deflection block, 6-balance block, 7-base, 8-pin, 9-second positioning pull rod, 10-protection ring, 11-airtight base, 12-airtight ejector rod, 13-airtight support block, 14-second guide shaft, 15-airtight cover, 16-pressure plate; 17-first pin, 18-first screw, 19-second screw, 20-chuck body, 21-tightening screw, 22-third screw, 23-first O ring, 24-fourth screw, 25-slotted pan head set screw, 26-second O ring, 27-third O ring, 28-fifth screw, 29-main shaft, 30-sixth screw, 31-spring, 32-first hexagon head hole screw, 33-second hexagon head hole screw, 34-seventh screw, 35-eighth screw, 36-ninth screw.

DETAILED DESCRIPTION

The specific embodiments of the present disclosure will be further described in detail below in combination with the accompanying drawings.

A wheel clamp includes a clamping jaw 1, a first positioning pull rod 2, a balance block housing 3, a first guide shaft 4, a deflection block 5, a balance block 6, a base 7, pins 8, second positioning pull rods 9, a protection ring 10, airtight bases 11, airtight ejector rods 12, airtight support blocks 13, second guide shafts 14, airtight covers 15, pressure plates 16, first pins 17, first screws 18, second screws 19, a chuck body 20, a tightening screw 21, a third screw 22, a first O ring 23, fourth screws 24, slotted pan head set screws 25, second O rings 26, third O rings 27, a fifth screw 28, a main shaft 29, a sixth screw 30, a spring 31, first hexagon head hole screws 32, a second hexagon head hole screw 33, seventh screws 34, eighth screws 35, and ninth screws 36.

The base 7 is connected to the main shaft 29 by the fifth screw 28, the chuck body 20 is fixed to the base 7 by the third screw 22, the tightening screw 21 connects the chuck body 20 with the main shaft 29, and the protection ring 10 presses the first O ring 23 to the gap between the chuck body 20 and the base 7, plays a sealing role and is tightened with the sixth screw 30. The lower surfaces of the six groups of second positioning pull rods 9 are engaged with the toothed surface of the chuck body 20 and tightened with two second screws 19 respectively, the first positioning pull rod 2 is connected and fixed to the second positioning pull rods 9 by the two pins 8, the clamping jaw 1 is connected and fixed to the first positioning pull rod 2 by the two first screws 18 and the two first pins 17, the balance block housing 3 is connected and fixed to the base 7 by the seventh screws 34, the first guide shaft 4 passes through a through hole of the balance block housing 3 and passes through the deflection block 5, two ends of the balance block housing 3 restrict the axial movement of the first guide shaft 4 via screws, the balance block 6 is mounted in an inner groove of the balance block housing 3, the two second guide shafts 14 pass through the through holes of the balance block 6 and enter a bottom hole of the balance block housing 3, the second guide shafts 14 are tightened on corresponding threaded holes of the balance block housing 3 via the two first hexagon head hole screws 32, and the axial movement of the two second guide shafts 14 is restricted. The spring 31 is arranged in a bottom hole of the balance block 6, the second hexagon head hole screw 33 is tightened on a corresponding threaded hole of the balance block housing 3 to restrict the axial movement of the spring 31, the two pressure plates 16 are mounted at the two ends of the first positioning pull rod 2, and the pressure plates 16 are connected and fixed to the balance block housing 3 by a group of eighth screws 35 to restrict the movement of the first positioning pull rod 2 in the axial direction of the main shaft. Three groups of airtight mechanisms are uniformly distributed in the circumferential direction of the upper surface of the base, in which the airtight base 11 is connected and fixed to the base 7 by a group of ninth screws 36, the third O ring 27 is mounted in a lower groove of the airtight base 11, the airtight ejector rod 12 is mounted in a circular hole of the airtight base 11, two slotted pan head set screws 25 are used to restrict the rotation of the airtight ejector rod 12, the second O ring 26 is mounted between the airtight base 11 and the airtight ejector rod 12, the airtight support block 13 is connected and fixed to the upper surface of the airtight ejector rod 12 by a fourth screw 24, and the airtight cover 15 seals the air passage inside the base through a group of ninth screws 36 and a third O ring 27.

In actual use, the main shaft 29 drives the second positioning pull rods 9 on the chuck body 20 to extend and contract in the radial direction via the tightening screw 21, the clamping jaw 1 is at a position within the travel range of extension and contraction, the wheel is positioned and clamped by the fixture, the airtight support blocks 13 are pressed down by the wheel and flush with the support plane of the clamping jaw 1, at this time, the airtight ejector rods 12 press the second O rings 26 to prevent air from flowing out of the airtight detection position, a detection system of a machine tool detects a preset air pressure value which indicate that the wheel has been placed correctly, and if the wheel is not placed correctly on the fixture, the machine tool will alarm through the detected pressure feedback. The airtight detection mechanisms of the present disclosure can adapt to eight sizes of wheels of 15, 16, . . . , 22 inches by mounting two kinds of airtight support blocks 13 of different structures and using two groups of air passages on the inner and outer rings of the base 7. When a centrifugal force compensation mechanism of the present disclosure works, the balance block 6 transfers the centrifugal force itself to the first positioning pull rod 2 via the deflection block 5 along the second guide shafts 14 under the action of centrifugal force at a high rotational speed to offset part of the centrifugal force generated by the clamping jaw 1, the first positioning pull rod 2 and the second positioning pull rods 9, so that the fixture can still maintain enough clamping force at a high rotational speed. The elasticity of the spring 31 keeps the balance block 6 in contact with the deflection block 5 at all times without shaking in the absence of axial constraints.

The invention claimed is:
1. A wheel clamp comprising
a main shaft;

a base connected to the main shaft by a fifth screw;
a chuck body fixed to the base by a third screw, the chuck body has a toothed surface;
a tightening screw connects the chuck body with the main shaft;
a protection ring pressing a first O ring to a gap between the chuck body and the base, the first O ring plays a sealing role and the protection ring is tightened with a sixth screw;
second positioning pull rods, the lower surfaces of which are engaged with the toothed surface of the chuck body, and each second positioning pull rod is tightened with two second screws respectively;
six first positioning pull rods respectively connected and fixed to the six second positioning pull rods by two pins;
six clamping jaws respectively connected and fixed to the six first positioning pull rods by two first screws and two first pins;
a balance block housing connected and fixed to the base by seventh screws, the balance block housing has a through hole, two bottom holes and two threaded holes;
a first guide shaft passing through the through hole of the balance block housing and passing through a deflection block, two ends of the balance block housing restrict the axial movement of the first guide shaft;
a balance block mounted in an inner groove of the balance block housing, the balance block has two through holes;
two second guide shafts respectively passing through the two through holes of the balance block and entering the two bottom holes of the balance block housing, wherein the second guide shafts are respectively tightened on the two threaded holes of the balance block housing via two first hexagon head hole screws, and the axial movement of the two second guide shafts is restricted;
a spring arranged in a bottom hole of the balance block;
a second hexagon head hole screw tightened on a corresponding threaded hole of the balance block housing to restrict the axial movement of the spring;
two pressure plates mounted at the two ends of the first positioning pull rod, wherein the pressure plates are connected and fixed to the balance block housing by a group of eighth screws to restrict the movement of the first positioning pull rod in the axial direction of the main shaft;
three airtight mechanisms are uniformly distributed in the circumferential direction of the upper surface of the base, wherein each of the airtight mechanisms includes:
an airtight base connected and fixed to the base by a group of ninth screws;
a third O ring mounted in a lower groove of the airtight base;
an airtight ejector rod mounted in a circular hole of the airtight base;
two slotted pan head set screws used to restrict the rotation of the airtight ejector rod;
a second O ring mounted between the airtight base and the airtight ejector rod;
an airtight support block connected and fixed to the upper surface of the airtight ejector rod by a fourth screw; and
an airtight cover sealing an air passage inside the base.

2. The wheel fixture according to claim 1, wherein
the two slotted pan head set screws are kept horizontal in the slotted direction during use,
hole directions corresponding to the two first hexagon head hole screws and the second hexagon head hole screw are kept identical during use.

3. The wheel fixture according to claim 1, wherein weight reduction pits are disposed in the lower surface of the base.

4. The wheel fixture according to claim 1, wherein the balance block is restricted to a fixed height by the second guide shafts such that sufficient clearances are reserved between the upper and lower surfaces of the balance block and the balance block housing and the base.

\* \* \* \* \*